(12) United States Patent
Watanabe et al.

(10) Patent No.: US 11,057,548 B2
(45) Date of Patent: Jul. 6, 2021

(54) COIL UNIT, MANUFACTURING METHOD THEREOF, AND PHOTOGRAPHING OPTICAL DEVICE

(71) Applicant: NIDEC SANKYO CORPORATION, Nagano (JP)

(72) Inventors: Toshiyuki Watanabe, Nagano (JP); Shinji Minamisawa, Nagano (JP); Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 448 days.

(21) Appl. No.: 16/162,959

(22) Filed: Oct. 17, 2018

(65) Prior Publication Data
US 2019/0124237 A1   Apr. 25, 2019

(30) Foreign Application Priority Data
Oct. 20, 2017   (JP) .............................. JP2017-203583

(51) Int. Cl.
| H04N 5/225 | (2006.01) |
| H01F 5/02 | (2006.01) |
| H01F 41/064 | (2016.01) |
| H04N 5/232 | (2006.01) |
| H01F 41/098 | (2016.01) |
| H01F 41/096 | (2016.01) |
| H01F 27/30 | (2006.01) |
| H01F 27/32 | (2006.01) |

(Continued)

(52) U.S. Cl.
CPC ............ *H04N 5/2253* (2013.01); *H01F 5/02* (2013.01); *H01F 27/306* (2013.01); *H01F 27/325* (2013.01); *H01F 41/064* (2016.01); *H01F 41/096* (2016.01); *H01F 41/098* (2016.01); *H04N 5/2251* (2013.01); *H04N 5/2254* (2013.01); *H04N 5/2257* (2013.01); *H04N 5/23287* (2013.01); *H04R 5/00* (2013.01); *H01F 7/1646* (2013.01); *H01F 2005/027* (2013.01)

(58) Field of Classification Search
None
See application file for complete search history.

(56) References Cited

U.S. PATENT DOCUMENTS

| 10,409,026 B2* | 9/2019 | Inagaki | H02K 41/0356 |
| 10,768,658 B2* | 9/2020 | Asano | G05G 9/047 |

(Continued)

FOREIGN PATENT DOCUMENTS

| JP | 2015225943 A | 12/2015 |
| JP | 2017021093 A | 1/2017 |
| JP | 2017122823 A | 7/2017 |

*Primary Examiner* — William B Perkey
(74) *Attorney, Agent, or Firm* — Cantor Colburn LLP

(57) ABSTRACT

A coil unit may include coil holding member configured to hold a coil; and a coil held by the coil holding member and formed by a conducting wire in a wound state. A direction perpendicular to a length direction of the conducting wire is a thickness direction of the coil. The coil holding member may include an abutment surface configured to abut against one end surface in the thickness direction of the coil, a convex unit protruding from the abutment surface and around which the conducting wire is wound, and a coil pressing unit extending from a front end surface of the convex unit and configured to press the other end surface in the thickness direction of the coil.

13 Claims, 10 Drawing Sheets

(51) Int. Cl.
  *H04R 5/00* (2006.01)
  *H01F 7/16* (2006.01)

(56) References Cited

U.S. PATENT DOCUMENTS

| | | | | |
|---|---|---|---|---|
| 2005/0283971 | A1* | 12/2005 | Erpelding | G11B 5/5569 29/605 |
| 2009/0285439 | A1* | 11/2009 | Yuasa | H04R 1/06 381/412 |
| 2015/0348688 | A1* | 12/2015 | Yanagisawa | H04N 5/23287 335/297 |
| 2017/0374247 | A1* | 12/2017 | Minamisawa | H01F 5/02 |
| 2019/0124237 | A1* | 4/2019 | Watanabe | H01F 41/064 |
| 2020/0073203 | A1* | 3/2020 | Arai | G03B 5/06 |

* cited by examiner

COIL UNIT, MANUFACTURING METHOD THEREOF, AND PHOTOGRAPHING OPTICAL DEVICE

CROSS REFERENCE TO RELATED APPLICATION

The present application claims priority under 35 U.S.C. § 119 to Japanese Application No. 2017-203583 filed Oct. 20, 2018, the entire content of which is incorporated herein by reference.

TECHNICAL FIELD

At least an embodiment of the present invention relates to a coil unit including a coil and a coil holding member configured to hold the coil, a manufacturing method thereof, and a photographing optical device including the coil unit.

BACKGROUND

Conventionally, in a photographing optical device mounted on a cellular phone or the like, a function of correcting a camera shake by moving an optical module to restrain the camera shake is developed to control a disturbance of a photographed image caused by a user's camera shake. In the camera shake correction function, a configuration is adopted in which the optical module including an optical element is movably supported relative to a fixation body formed of a chassis such as a cellular phone, and the optical module is moved according to the shake by a shake correction drive mechanism.

The camera shake correction drive mechanism includes a magnet and a coil and is configured to apply an electromagnetic force by the coil in a magnetic field of the magnet to drive the optical module.

For example, Japanese Unexamined Patent Application Publication No. 2015-225943 (hereinafter, "Patent Literature 1") discloses a coil unit obtained by attaching a coil formed in a substantially rectangular frame shape to a coil holding member. In the coil holding member, a convex unit to which the coil is attached is formed in a protruding manner, and a conducting wire of the coil is wound directly around the convex unit.

Further, Japanese Unexamined Patent Application Publication No. 2017-021093 (hereinafter, referred to as "Patent Literature 2") states that an abutment surface against which one end surface of the coil abuts, is formed on the coil holding member, a convex unit around which the coil is directly wound is formed in a protruding manner on the abutment surface, and a distance between the abutment surface and the distal end of the convex unit is equal to the thickness of the coil.

On the other hand, in Japanese Unexamined Patent Application Publication No. 2017-122823 (hereinafter, "Patent Literature 3"), a coil is not wound directly around a coil holding unit, however, an elastic deformation unit is provided in the coil holding unit and when an annular coil is attached in a wound state, the elastic deformation unit deforms elastically to temporarily fix the coil to the coil holding unit. It is described that, after the temporary fixation, regular fixation is performed by a thermosetting adhesive.

SUMMARY

However, in the structures of Patent Literatures 1 and 2, the coil may fall off from the convex unit of the coil holding unit, when an impact or the like is applied from outside. In this case, as described in Patent Literature 3, it is conceivable, after attaching the coil to the coil holding member, to fix the coil to the coil holding member by an adhesive or the like, however, application and curing of the adhesive take time, and thus, a configuration where the use of an adhesive is reduced as much as possible is desirable.

Further, it is also conceivable to adopt a structure where the coil is held by the elastic force of the elastic deformation unit described in Patent Literature 3; however, if the elastic force is small, the coil may fall off upon application of an impact force or the like exceeding the elastic force, and if the elastic force is too large, it is difficult to attach the coil and the assembling operation is complicated.

At least an embodiment of the present invention has been made in view of these circumstances. At least an embodiment of the invention provides a coil unit, a manufacturing method thereof, and a photographing optical device including the coil unit, capable of facilitating the attaching of the coil and preventing the attached coil from falling off.

The coil unit of at least an embodiment of the present invention includes a coil holding member configured to hold a coil and a coil held by the coil holding member and formed by a conducting wire in a wound state. When a direction perpendicular to a length direction of the conducting wire is a thickness direction of the coil, the coil holding member includes an abutment surface configured to abut against one end surface in the thickness direction of the coil, a convex unit protruding from the abutment surface and around which the conducting wire is wound, and a coil pressing unit extending from the front end surface of the convex unit and configured to press the other end surface in the thickness direction of the coil.

The coil is held in a sandwiched manner at both ends in the thickness direction by the abutment surface of the coil holding member and the coil pressing unit, and thus, the coil can be prevented from falling off. Therefore, it is possible to omit the adhesive for fixing the coil, or, even if the adhesive is used, a minimal amount of adhesive is enough.

In a coil unit of at least an embodiment of the present invention, the coil pressing unit can be formed by deforming a part of the convex unit.

The coil pressing unit may be fixed to the convex unit as a separate component from the coil holding member, however, in the above-described embodiment, the coil pressing unit is formed by deforming a part of the convex unit, and thus, it is possible to press the coil without using separate components and the like in one coil holding member.

In a coil unit of at least an embodiment of the present invention, the coil pressing unit may be made of synthetic resin. A coil pressing unit made of synthetic resin can be easily deformed by heat or the like and thus, the fixation operation of the coil can be facilitated.

In a coil unit of at least an embodiment of the present invention, the coil may be formed in a substantially rectangular frame shape having a long side unit and a short side unit, and the coil pressing unit may be provided to press at least the long side unit.

The long side unit of the coil easily breaks due to being long, however, it is possible to stably hold the coil by pressing the long side unit.

In a coil unit of at least an embodiment of the present invention, the coil pressing unit may be provided in a linear portion avoiding a curved unit between the long side unit and the short side unit.

A thickness dimension of the curved unit is larger and fluctuates more easily than other portions, whereas a thickness fluctuation of the linear unit is small and thus, the coil can be surely held and stably fixed by providing the coil pressing unit in the linear portion.

In a coil unit of at least an embodiment of the present invention, the coil pressing unit may be provided to press each of the long side unit and the short side unit.

By pressing the four sides of the coil, the coil can be fixed more stably and can be surely prevented from falling off.

In a coil unit of at least an embodiment of the present invention, the coil pressing unit configured to press the long side unit and the coil pressing unit configured to press the short side unit may have a length corresponding to a length of the long side unit or the short side unit.

That is, the coil pressing unit configured to press the long side unit is formed longer than the coil pressing unit configured to press the short side unit. Thus, the long side unit that easily falls off can be pressed and stably fixed in a long range.

In a coil unit of at least an embodiment of the present invention, the number of the coil pressing units configured to press the long side unit may be set larger than the number of the coil pressing units configured to press the short side unit.

The long side unit can be stably fixed by placing more coil pressing units on the long side unit than on the short side unit.

In this case, all the coil pressing units may be all formed equally in size. When the coil pressing units have the same size, it is possible to unify and facilitate the management in deforming the coil pressing unit.

A photographing optical device of at least an embodiment of the present invention includes the coil unit, an optical module including a lens and an imaging element, the optical module being fixed to the coil holding member, a fixation body configured to support the coil unit oscillatably, and a driving magnet fixed to the fixation body and placed facing the coil.

The coil is held in a sandwiched manner at both ends of the thickness direction by the abutment surface of the coil holding member and the coil pressing unit, and thus, is fixed stably without a problem such as falling off. Therefore, the coil can perform a stable operation with the driving magnet.

In a photographic optical device of at least an embodiment of the present invention, the convex unit of the coil holding member may be formed with a second convex unit protruding toward the driving magnet relative to the coil pressing member.

With such a configuration, it is unlikely that the coil comes into contact with an outside member when handling the coil unit. Thus, damage of the coil can be prevented when handling the coil unit. Further, in the photographing optical device, the second convex unit regulates an oscillation range of the coil unit during oscillation of the coil unit and thus, a contact between the coil and the driving magnet can be prevented and an occurrence of damage can be avoided.

A method of manufacturing the coil unit of at least an embodiment of the present invention includes: forming a protrusion in the convex unit of the coil holding member and after attaching the coil to the convex unit, forming the coil pressing unit by deforming the protrusion.

In a method of manufacturing the coil unit of at least an embodiment of the present invention, the protrusion is made of synthetic resin and the coil pressing unit may be formed by deforming the protrusion by heat.

If the protrusion is mechanically deformed, there is a concern of chipping, cracking, or the like, however, if the protrusion is deformed by heat, the coil pressing unit can be easily formed without the occurrence of damage or the like.

According to at least an embodiment of the present invention, attaching of the coil to the coil holding member is facilitated and the attached coil can be surely prevented from falling off.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7A illustrates a state where the coil is held by a coil pressing unit, and FIG. 7B illustrates a state before the coil pressing unit is formed;

FIG. 8A illustrates a state before the coil pressing unit is formed, and FIG. 8B illustrates a state where the coil is held by the coil pressing unit;

DETAILED DESCRIPTION

An embodiment of a photographing optical device incorporating an embodiment of a coil unit according to the present invention will be described below with reference to the drawings.

A photographing optical device 100 incorporating a coil unit of the present embodiment is a small-type and thin-type camera mounted on a mobile device such as a mobile phone, a drive recorder, a monitoring camera system, or the like, and has a shake correction function configured to correct a shake such as a camera shake.

In the following description, three directions perpendicular to one another are each referred to as an X-axis direction, a Y-axis direction, and a Z-axis direction and in a stationary state, it is assumed that an optical axis L (lens optical axis/optical axis of optical element) is placed in the Z-axis direction. Further, among shakes in each of the directions, a rotation around the X-axis corresponds to a so-called pitching (vertical shake), a rotation around the Y-axis corresponds to a so-called yawing (horizontal shake), and a rotation around the Z-axis corresponds to a so-called rolling. Further, one side in the X-axis direction is denoted by +X, while the other side is denoted by −X, one side in the Y-axis direction is denoted by +Y, while the other side is denoted by −Y, and one side in the Z-axis direction (the side of a photographic subject/front side in the optical axis direction) is denoted by +Z, while the other side (the side opposite to the side of a photographic subject/rear side in the optical axis direction) is denoted by −Z for description. Further, in FIGS. 1 to FIG. 5 and the like, +Z side being the one side of the Z-axis is directed upward and this state is set as the stationary state. In the following, unless stated otherwise, description is given in this stationary state.

(Schematic Configuration of Photographing Optical Device 100)

Figure 1:
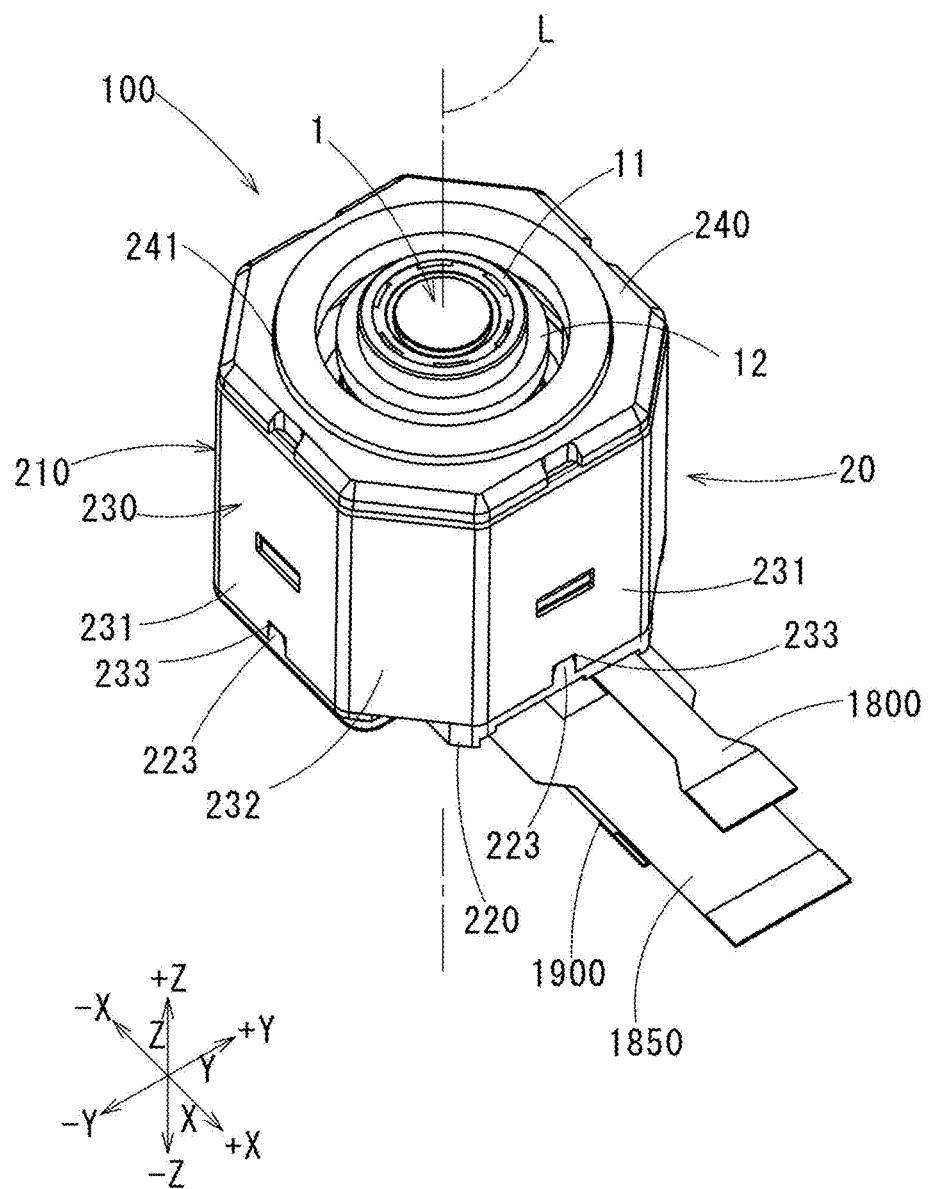
FIG. 1 is a perspective view of an assembled state of a photographing optical device of an embodiment of the present invention.
Figure 2:
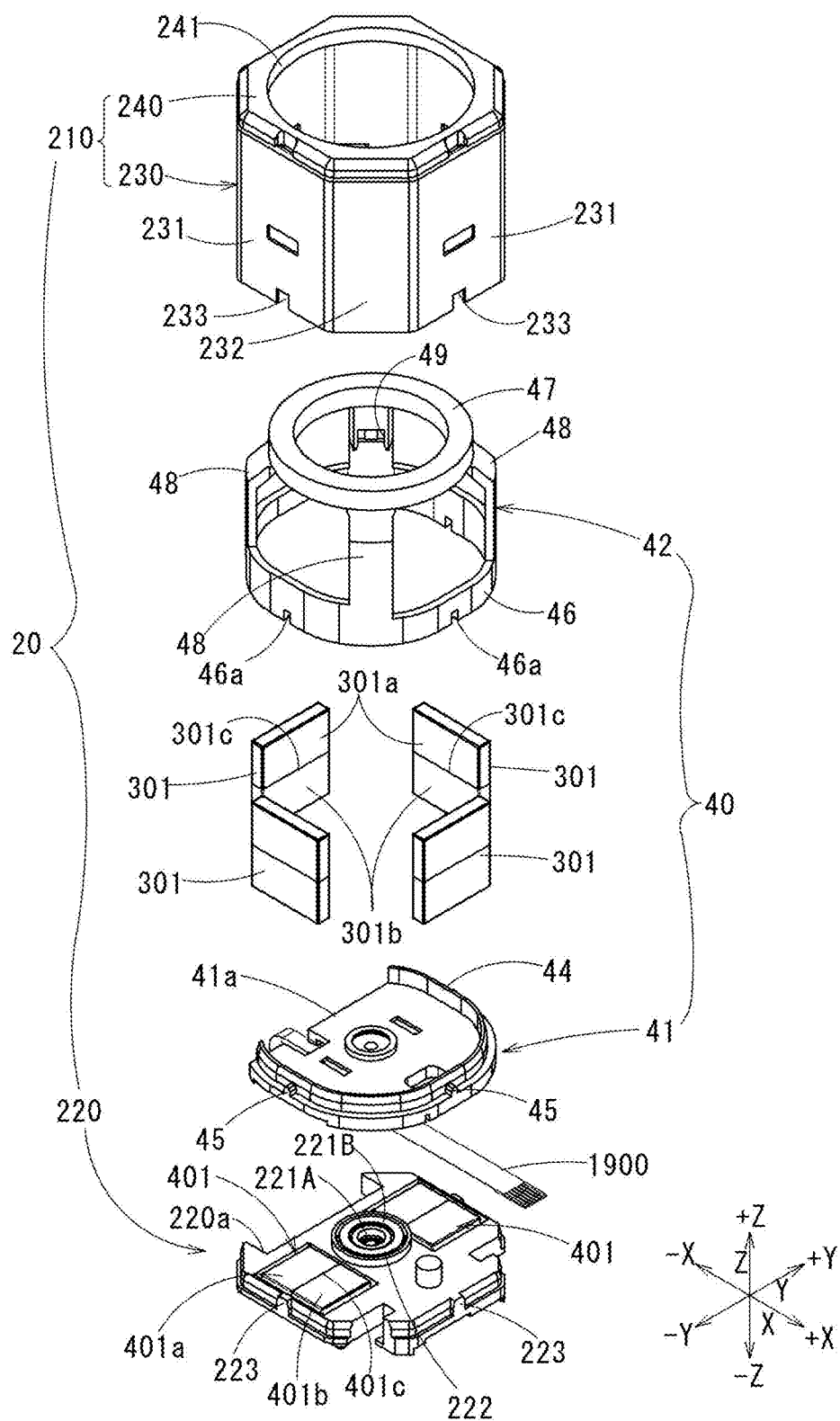
FIG. 2 is an exploded perspective view of a fixation body and a rotor in the photographing optical device in FIG. 1.
Figure 3:
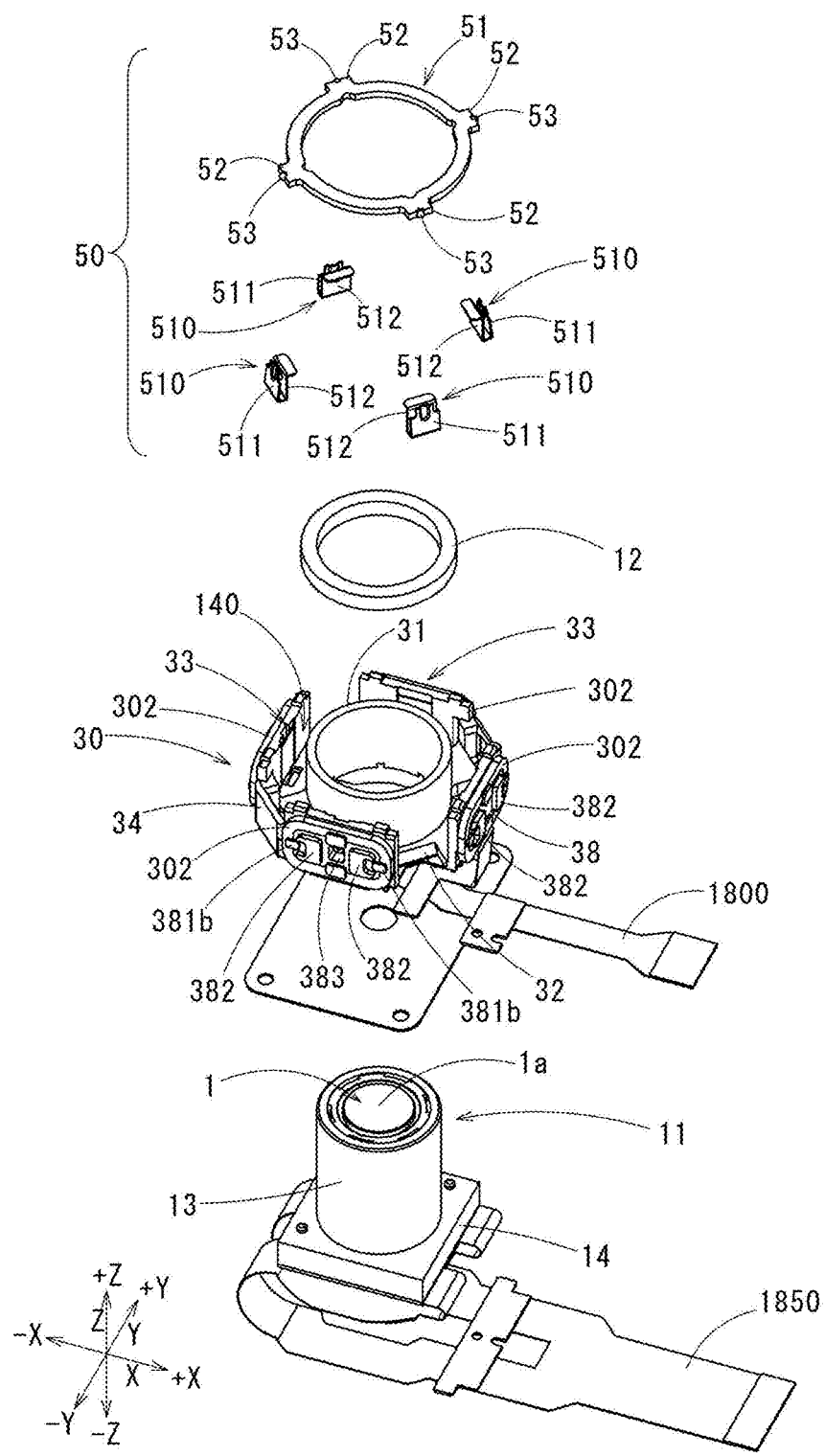
FIG. 3 is an exploded perspective view of a portion, excluding a rotor, of a movable body in the photographing optical device in FIG. 1.
Figure 4:
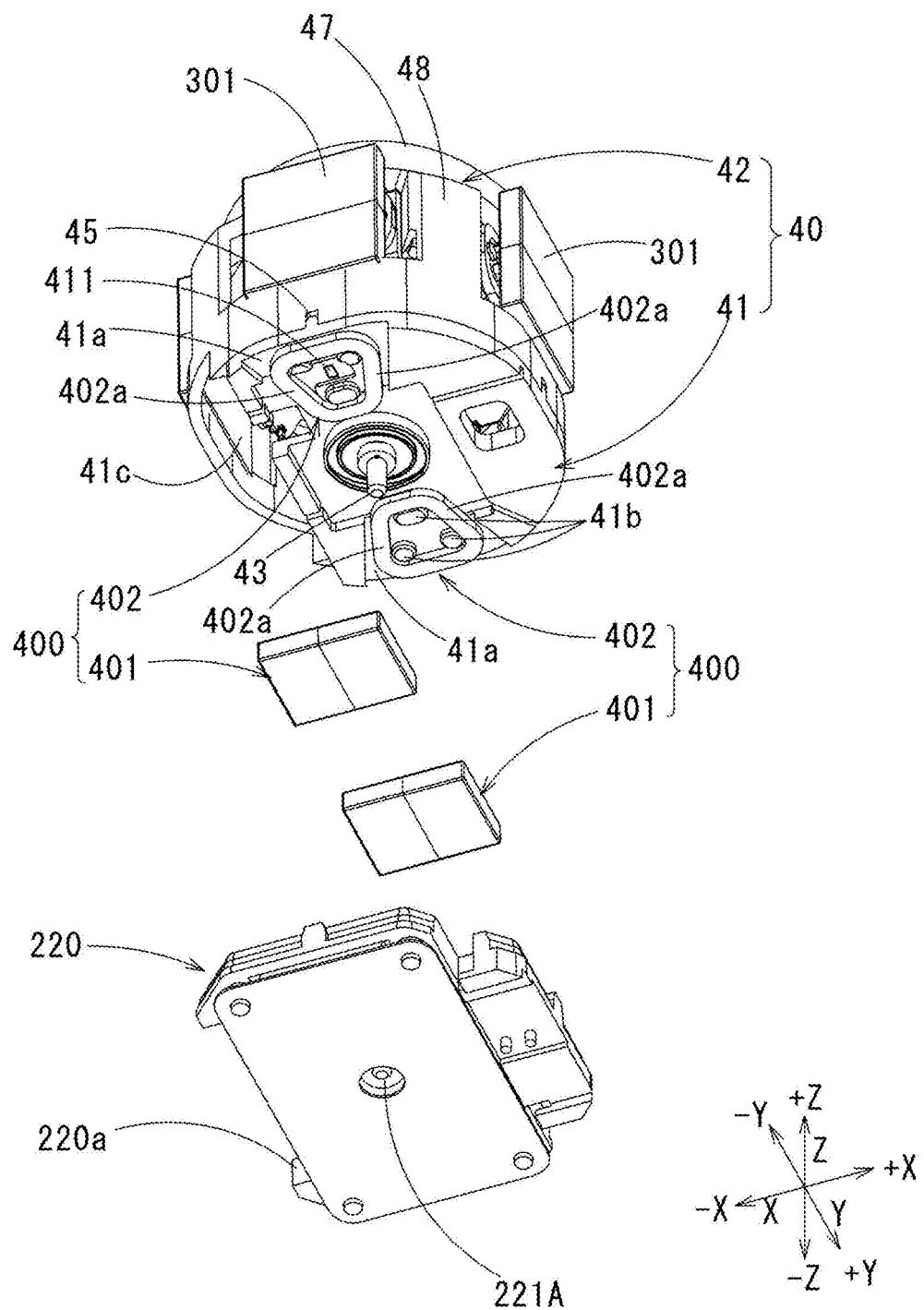
FIG. 4 is an exploded perspective view illustrating a rolling drive mechanism between the rotor and a bottom cover of the embodiment of the present invention.
Figure 5:
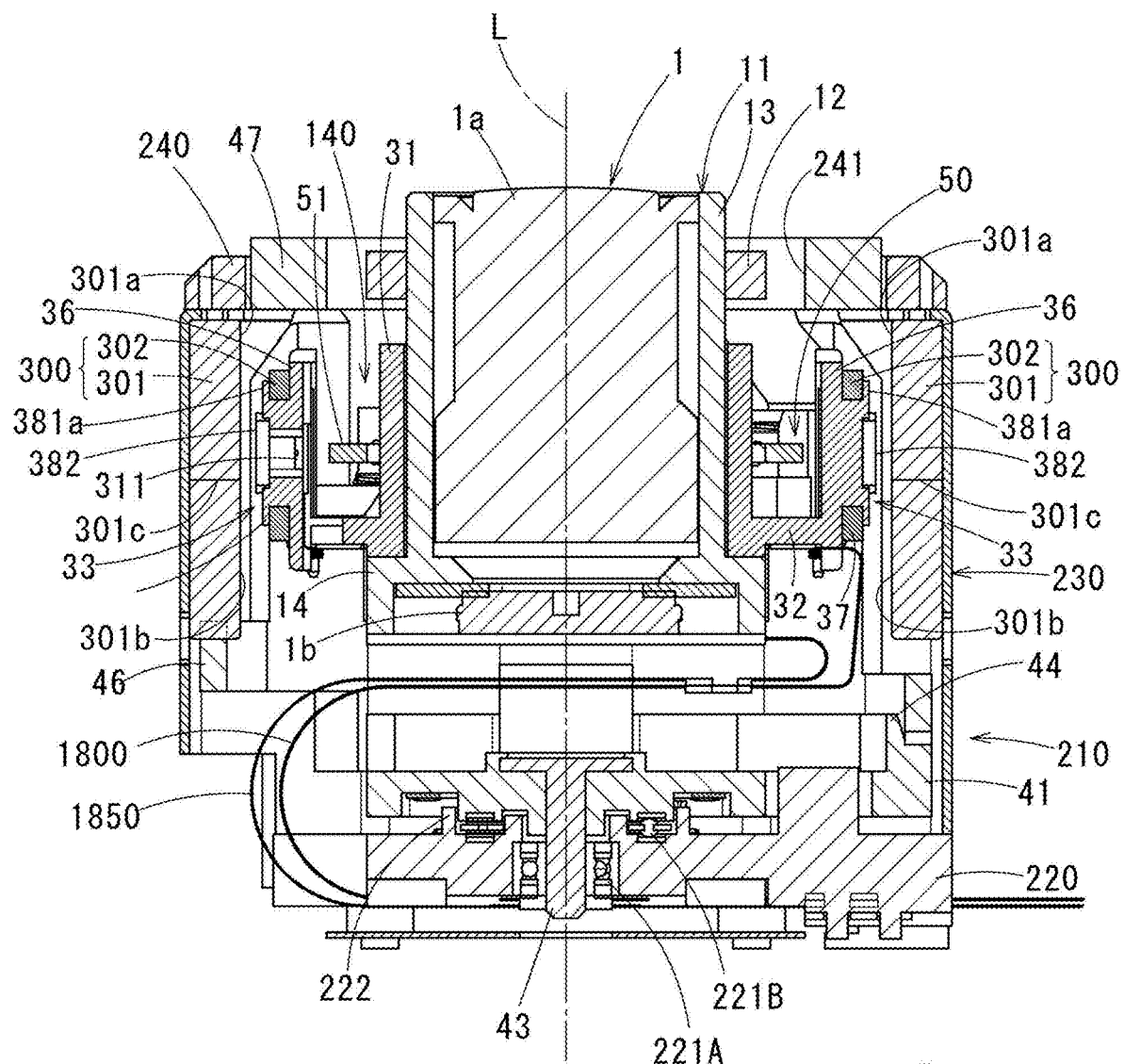
FIG. 5 is a longitudinal sectional view taken along an X-Z plane passing through the optical axis in the photographing optical device in FIG. 1.

FIG. 1 is a perspective view illustrating an appearance of an assembled state of the photographing optical device 100 of the embodiment; FIG. 2 and FIG. 3 are exploded perspective views in which the photographing optical device 100 is disassembled and separated into two drawings for illustration; FIG. 4 is an exploded perspective view for illustrating a rolling mechanism; FIG. 5 is a longitudinal sectional view having the optical axis L of the photographing optical device 100 as center; and FIG. 6 is a cross-sectional view of the vicinity of a later-described gimbal mechanism 50 of the photographing optical device 100.

As illustrated in these figures, the photographing optical device 100 of the present embodiment includes a movable body 10 provided with an optical module 1 thorough which the optical axis L extends along the Z-axis direction, a fixation body 20 provided to surround the movable body 10, an oscillation drive mechanism 300 configured to generate a magnetic driving force for relatively displacing the movable body 10 around the X-axis and the Y-axis with respect to the fixation body 20, between the movable body 10 and the fixation body 20, and a rolling drive mechanism 400 configured to generate a magnetic driving force for relatively revolving the movable body 10 around the optical axis L with respect to the fixation body 20.

Then, the photographing optical device 100 is configured so that based on a result of detection of a camera shake by a shake detection sensor (not illustrated) such as a gyroscope mounted on the movable body 10, the movable body 10 can be oscillated by the oscillation drive mechanism 300 around two axes (a first axis R and a second axis R2 (described in detail later) different from the X-axis and the Y-axis) perpendicular to the optical axis L to correct a pitching and a yawing, and the movable body 10 can be revolved by the rolling drive mechanism 400 around the Z-axis to correct a rolling.

Figure 6:
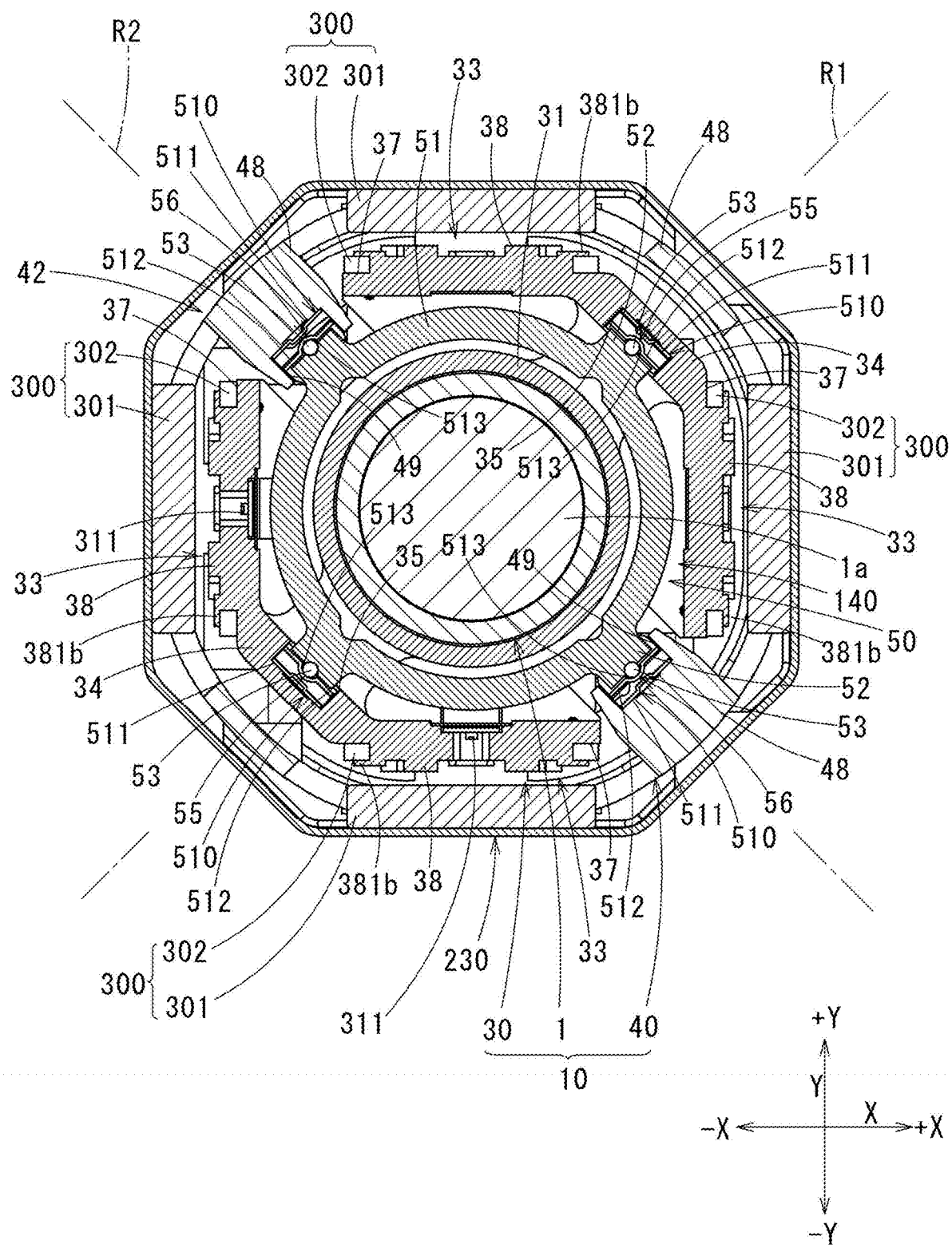
FIG. 6 is a cross-sectional view taken along an X-Y plane in the vicinity of a gimbal mechanism in the photographing optical device in FIG. 1.

More specifically, the movable body 10 of the present embodiment includes a holder frame 30 configured to hold the optical module 1 having an optical element, and a rotor 40 placed outside of the holder frame 30 (see FIG. 6). The fixation body 20 includes a bottom cover 220 under a case 210 surrounding the rotor 40 of the movable body 10, as illustrated in FIG. 2. In the bottom cover 220 of the fixation body 20, bearings 221A, 221B configured to rotatably support the rotor 40 around the optical axis L are provided, and the rolling drive mechanism 400 configured to revolve the rotor 40 around the optical axis L is provided between the rotor 40 of the movable body 10 and the bottom cover 220 of the fixation body 20 (see FIG. 4).

Further, in the movable body 10 of the present embodiment, the holder frame 30 is supported via the gimbal mechanism 50 inside the rotor 40, and by this gimbal mechanism 50, is supported oscillatably around the two axes (see FIG. 6), that is, the first axis R and the second axis R2, perpendicular to the optical axis L direction and perpendicular to each other. The rotor 40 is formed in a frame shape, and the oscillation drive mechanism 300 is provided between the case 210 of the fixation body 20 surrounding the outside of the rotor 40 and the holder frame 30.

With such a support structure, in the movable body 10, the rotor 40 is revolved by the rolling drive mechanism 400 around the optical axis L relative to the bottom cover 220 of the fixation body 20, and by the oscillation drive mechanism 300, the holder frame 30 inside the rotor 40 is oscillated around the two axes, that is, the first axis R and the second axis R2, perpendicular to the optical axis L (these operations will be described in detail later). In this embodiment, the first axis R and the second axis R2 are perpendicular to the optical axis L direction, and the first axis R and the second axis R2 are orthogonal and placed at an angle of 45° relative to the X-axis and the Y-axis.

(Configuration of Fixation Body 20)

The fixation body 20 includes the case 210 surrounding the movable body 10 and the bottom cover 220 fixed to the lower part (at the other side −Z in the Z-axis direction) of the case 210. The case 210 includes a cylindrical body 230 formed, in a square cylindrical shape (octagonal cylindrical shape as seen in a cross section in an example in FIG. 1 or the like), by a plurality of side plates 231, 232, and a cover frame 240 protruding inwardly in the radial direction, the cover frame 240 being fixed on the cylindrical body 230 (at the one side +Z in the Z-axis direction). A plurality of notches 233 are spaced apart in a circumferential direction at a lower end of the cylindrical body 230.

At the center of the cover frame 240, a circular opening 241 is formed, in the opening 241, a later-described upper annular unit 47 of the rotor 40 is placed, and light from a subject is led through an internal space of the upper annular unit 47 to the optical module 1.

At the center of the bottom cover 220, a cylindrical unit 222 along the optical axis L direction is integrally formed, the bearings 221A, 221B are fixed inside the cylindrical unit 222, and the rotor 40 of the movable body 10 is rotatably supported by the bearings 221A, 221B. The cross-sectional shape of the cylindrical body 230 of the case 210 is octagonal, and thus, the plan view of the bottom cover 220 is formed in a substantially octagonal shape to fit into the cylindrical body 230. When fixed to the lower end of the cylindrical body 230 of the case 210, a plurality of projections 223 to be fitted into the notches 233 of the cylindrical body 230 are provided.

It is noted that a removed unit 220a obtained by removing a part of the outer periphery of the bottom cover 220 is formed at the outer periphery of the bottom cover 220.

(Configuration of Movable Body 10)

The movable body 10 of the photographing optical device 100 includes the rotor 40 rotatably supported by the bearings 221A, 221B of the bottom cover 220 in the fixation body 20, the holder frame 30 supported via the gimbal mechanism 50 inside the rotor 40, and the optical module 1 held by the holder frame 30.

The rotor 40 includes a rotor bottom 41 and a rotor frame 42 fixed on the rotor bottom 41. The rotor bottom 41 is formed in a substantially plate shape to face a top surface of the bottom cover 220 of the fixation body 20, a shaft unit 43 extending in a −Z direction of the Z-axis direction along the optical axis L is integrally fixed at the center of the rotor bottom 41 (see FIG. 4), and the shaft unit 43 is rotatably supported in the bearing 221A of the bottom cover 220. In this case, the bearing 221A is a radial bearing. As illustrated in FIG. 2 and FIG. 5, in the bottom cover 220, the bearing 221B configured to receive a thrust load of the rotor 40 is provided annularly around the bearing 221A, and the rotor bottom 41 of the rotor 40 is provided on the bearing 221B in a mounted state. Thus, the rotor 40 is supported by the two types of bearings, that is, the radial bearing 221A and the thrust bearing 221B.

While being supported by the bearings 221A, 221B, a bottom surface of the rotor bottom 41 faces the top surface of the bottom cover 220 with a slight gap therebetween, and in the portion where the two faces face each other, the rolling drive mechanism 400 is provided. The rotor bottom 41 has, as seen in a plan view, a planar shape obtained by removing a part of a circle, on the top surface, a peripheral wall unit 44 is formed along a circumferential direction except for a removed unit 41c, and a plurality of projections 45 are formed to be spaced apart in the circumferential direction, on the peripheral wall unit 44. The removed unit 41c is used as a passage when externally pulling out the oscillation drive mechanism 300 or a flexible wiring boards 1800, 1850 of the optical module 1 or the like to be placed above (in the +Z direction of the Z-axis) the rotor bottom 41. On the bottom surface of the rotor bottom 41, two rolling coils 402 of the rolling drive mechanism 400 are fixed as described below, and are externally connected by a flexible wiring board 1900.

In the embodiment, the rotor frame 42 includes a lower annular unit 46, an upper annular unit 47, and four frame units 48 configured to couple the both annular units 46, 47. The lower annular unit 46 is provided to fit onto the peripheral wall unit 44 of the rotor bottom 41, and a notch 46a configured to fit into the projection 45, in the fitted state, is formed. As a result, the rotor frame 42 is held and stopped from rotation by the rotor bottom 41. The upper annular unit 47 is formed in a circular annular shape, and when the lower annular unit 46 is attached to the rotor bottom 41, the upper annular unit 47 is to be placed on an extension (at the +Z side in the Z-axis direction) of the shaft unit 43 of the rotor bottom 41. While the rotor frame 42 is attached to the rotor bottom 41, the upper annular unit 47 is placed in the opening 241 of the cover frame 240.

The frame units 48 are spaced apart in the circumferential direction, between the lower annular unit 46 and the upper annular unit 47.

Further, inside two frame units 48 facing to each other at an angle of 180°, of the four frame units 48, a groove 49 facing radially inward of the rotor frame 42 is formed. The groove 49 is fixed with a later-described contact spring 510 of the gimbal mechanism 50, and the holder frame 30 configured to hold the optical module 1 is supported oscillatably around the axis of the second axis R2 inside the rotor frame 42 by the gimbal mechanism 50. Four oscillating coils 302 of the oscillation drive mechanism 300 are fixed to the holder frame 30 as described later.

The optical module 1 includes a module holder 11 configured to hold an optical element 1a, an imaging element 1b (see FIG. 5), an actuator for focusing driving (not illustrated) or the like, and a cylindrical weight 12 fixed on the module holder 11 (at the one side +Z in the Z-axis direction). Further, the module holder 11 includes a lens barrel unit 13 surrounding the optical element 1a and a base unit 14 configured to hold the imaging element 1b and the like and integrally formed at the lower end of the lens barrel unit 13. The base unit 14 is placed at a lower side (at the −Z side in the Z-axis direction) of the holder frame 30, the lens barrel unit 13 is held by the holder frame 30 while being protruded toward the +Z side in the Z-axis direction through the holder frame 30, and the weight 12 is attached to a distal end of the lens barrel unit 13 protruding from the holder frame 30.

(Configuration of Shake Correction Drive Mechanisms 300, 400)

The oscillation drive mechanism 300 is a magnetic drive mechanism utilizing a plate-shaped oscillation magnet (driving magnet in at least an embodiment of the present invention) 301 and the oscillating coil (coil in at least an embodiment of the present invention) 302, as illustrated in FIG. 5 and FIG. 6. In this embodiment, as a combination, four sets of the oscillation magnet 301 and the oscillating coil 302 are spaced apart by 90° in the circumferential direction of the holder frame 30. Each of the oscillating coils 302 is an air-core coil having no core, and is held at the one side +X in the X-axis direction of the holder frame 30, the other side −X in the X-axis direction thereof, one side +Y in the Y-axis direction thereof, and the other side −Y in the Y-axis direction thereof. The both oscillating coils 302 placed at the one side +X in the X-axis direction of the holder frame 30 and the other side −X in the X-axis direction thereof are formed, by a conducting wire, in an annular shape in which the X-axis direction is an axial center direction (thickness direction) of the coil, and the both oscillating coils 302 placed at the one side +Y in the Y-axis direction and the other side −Y in the Y-axis direction are formed, by a conducting wire, in an annular shape in which the Y-axis direction is an axial center direction (thickness direction) of the coil. Thus, any of the oscillating coils 302 is formed in an annular shape in which a direction perpendicular to the optical axis L direction is the axial center direction (thickness direction) of the coil. Further, these four oscillating coils 302 are formed with the same planar shape and thickness (height) dimension.

A detailed configuration of the holder frame 30 will be described later.

Further, the oscillation magnets 301 are respectively held on each inner surface of four side plates 231 spaced apart by 90° in the circumferential direction in the cylindrical body 230 of the case 210 (see FIG. 2). These four side plates 231 are respectively placed at the one side +X in the X-axis direction, the other side −X in the X-axis direction, the one side +Y in the Y-axis direction, and the other side −Y in the Y-axis direction, and thus the oscillation magnets 301 and the oscillating coils 302 face each other between the holder frame 30 and the case 210, in any of the one side +X in the X-axis direction, the other side −X in the X-axis direction, the one side +Y in the Y-axis direction, and the other side −Y in the Y-axis direction. In this case, the four sets of swinging magnets 301 and swinging coils 302 face each other through a space between the four frame units 48 of the rotor frame 42.

In this embodiment, the outer surface side and the inner surface side of the oscillation magnet 301 are magnetized to different poles. Further, the oscillation magnets 301 are magnetized while being separated into two in the optical axis L direction (Z-axis direction), magnetic poles 301a, 301b located at the side of the oscillating coil 302 are magnetized differently between the magnetic pole 301a located at one side in the optical axis L direction (the +Z side in the Z-axis direction) and the magnetic pole 301b located at the other side thereof (the −Z side thereof) (see FIG. 5 or the like), with a magnetization polarization line 301c being a boundary. Therefore, the magnetization polarization line 301c separating the both magnetic poles 301a, 301b is placed along a direction perpendicular to the optical axis L.

In the two oscillation magnets 301 placed respectively at the one side +X in the X-axis direction and the other side −X in the X-axis direction, the magnetization polarization line 301*c* is placed along the Y-axis direction, and in the two oscillation magnets 301 placed respectively at the one side +Y in the Y-axis direction and the other side −Y in the Y-axis direction, the magnetization polarization line 301*c* is placed along the X-axis direction.

Further, of the four oscillating coils 302, in the two oscillating coils 302 where the X-axis direction is the axial center direction of the coil, a longitudinal direction is formed in a rectangular shape extending in the Y-axis direction, and in the other two oscillating coils 302 where the Y-axis direction is the axial center direction of the coil, a longitudinal direction is formed in a rectangular shape extending in the X-axis direction. In any of the oscillating coils 302, upper and lower longer side units 302*b* are utilized as an effective side to face the magnetic poles 301*a*, 301*b* of each of the oscillation magnets 301, and while the oscillating coils 302 are not excited, the both effective sides (longer side units 302*b*) are placed at vertically equal distances from the magnetization polarization line 301*c* while running in parallel to the magnetization polarization line 301*c* of the facing oscillation magnets 301.

It is noted that the four oscillation magnets 301 are identical in magnetization pattern for an outer surface side and an inner surface side. Thus, the oscillation magnets 301 adjacent in the circumferential direction are not attracted to each other, and therefore, it is easy to assemble, for example. The case 210 is made of a magnetic material, and functions as a yoke for the oscillating magnet 301.

Similarly to the oscillation drive mechanism 300, the rolling drive mechanism 400 is a magnetic driving mechanism utilizing the plate-shaped rolling magnet 401 and the rolling coil 402. The rolling coil 402 is also an air-core coil having no core, and is held at a bottom surface (at the −Z side in the Z-axis direction) side of the rotor bottom 41. In this case, at the center of the rotor bottom 41, the shaft unit 43 extending in the optical axis L direction is provided, the rolling coils 402 are respectively provided with facing to each other at an angle of 180° around the shaft unit 43. Any of the rolling coils 402 is an air-core coil formed in an annular shape where a direction parallel to the optical axis L direction is the axial center direction (thickness direction) of the coil, and is formed in a trapezoidal frame shape as viewed in the axial center direction. In the rolling coils 402, the trapezoidal short sides are placed at the side of the shaft unit 43 of the rotor bottom 41, the trapezoidal long sides are placed at the side of the outer peripheral of the rotor bottom 41, and two oblique sides are placed along the radial direction of the rotor bottom 41. The two rolling coils 402 are formed with the same planar shape and thickness (height) dimension.

In the rotor bottom 41, a site where the rolling coil 402 is attached is a planar attachment surface (abutment surface) 41*a*, and one end surface in the thickness direction of the rolling coil 402 is fixed onto the attachment surface 41*a* with an adhesive or the like. It is noted that a plurality of convex units 41*b* placed inside the rolling coil 402 are provided on the surface of the attachment surface 41*a*, and when the outer peripheral surface of the convex units 41*b* contacts the inner peripheral surface of the rolling coil 402 in a trapezoidal frame shape as seen in a plan view, an attachment position of the rolling coil 402 (position in a surface direction of the attachment surface 41*a*) is regulated.

The rolling magnets 401 are respectively held with facing to each other at an angle of 180° at the side of the top surface (at the +Z side in the Z-axis direction) of the bottom cover 220 facing the bottom surface of the rotor bottom 41, around the bearings 221A, 221B. Further, the rolling magnet 401 is magnetized to a different pole between the side of the top surface (the +Z side in the Z-axis direction) and the side of the bottom surface (the −Z side in the Z-axis direction), and in the example illustrated in FIG. 2, the rolling magnet 401 is magnetized while being separated into two in the X-axis direction, and magnetic poles 401*a*, 401*b* located at the side of the rolling coil 402 are magnetized differently in the X-axis direction. Therefore, a magnetization polarization line 401*c* separating these magnetic poles 401*a*, 401*b* is placed along the Y-axis direction. The two rolling coils 402 provided in the rotor bottom 41 and the two rolling magnets 401 provided in the bottom cover 220 face each other, and an oblique side unit 402*a* of each of the trapezoidal-shaped rolling coils 402 is utilized as an effective side facing each of the magnetic poles 401*a*, 401*b* of the rolling magnet 401. While the rolling coil 402 is not excited, the both effective sides (oblique side units 402*a*) are placed obliquely at horizontally equal distances from the magnetization polarization line 401*c* of the rolling magnet 401, and are placed symmetrically around the magnetization polarization line 401*c*.

(Detailed Configuration of Holder Frame 30)

As illustrated in FIG. 3, FIG. 5, and FIG. 6, the holder frame 30 generally includes a cylindrical module holder holding unit 31 configured to internally hold the lens barrel unit 13 of the module holder 11, and a thick base unit 32 radially expanding in a flange shape at a lower end (the end of the other side −Z in the Z-axis direction) of the module holder holding unit 31. On the base unit 32, coil holding units 33 configured to respectively hold the four oscillating coils 302 are provided outward in the radial direction relative to the module holder holding unit 31, and a movable frame placement space 140 in which a movable frame 51 described later of the gimbal mechanism 50 is placed is formed between these coil holding units 33 and the module holder holding unit 31.

The coil holding units 33 are each provided at the +X side in the X-axis direction relative to the module holder holding unit 31, the −X side in the X-axis direction relative thereto, the +Y side in the Y-axis direction relative thereto, and the −Y side in the Y-axis direction, respectively. A set of the two coil holding units 33 adjacent in the circumferential direction is coupled by a coupling unit 34. That is, the two coil holding units 33 provided at the +X side in the X-axis direction and the +Y side in the Y-axis direction are coupled by the coupling unit 34, and the two coil holding units 33 provided at the −X side in the X-axis direction and the −Y side in the Y-axis direction are coupled by the coupling unit 34. As a result, the two coupling units 34 are placed with facing to each other at an angle of 180°, and the groove 35 is formed on the opposite surface (see FIG. 6). In an example illustrated in FIG. 6, the groove 35 is formed in the two coupling units 34 placed on the first axis R.

Further, a space between the coil holding units 33 provided at the +X side in the X-axis direction and the −Y side in the Y-axis direction are kept apart, and a space between the coil holding units 33 provided at the −X side in the X-axis direction and the +Y side in the Y-axis direction are also kept apart. Therefore, the space between these coil holding units 33 is also placed with facing to each other at an angle of 180°, via the module holder holding unit 31, that is, on the second axis R2 in the example illustrated in FIG. 6.

Then, in the space between the two coil holding units 33, the groove 49 formed inside the two frame units 48 facing to each other at an angle of 180°, out of the four frame units 48 of the rotor 40, is placed inwardly in the radial direction relative to the holder frame 30. As a result, the groove 35 of the coupling unit 34 between the coil holding units 33 and the groove 49 of the frame unit 48 of the rotor 40 are spaced apart by 90° around the module holder holding unit 31.

It is noted that the holder frame 30 is made of synthetic resin.

(Configuration of Coil Unit)

In the present embodiment, the coil unit is comprised of the oscillating coil (coil in at least an embodiment of the present invention) 302 of the oscillation drive mechanism 300 and the coil holding unit (coil holding member) 33 of the holder frame 30 configured to hold the oscillating coils 302.

The coil holding unit 33 includes rear plates 36 rising toward the +Z side in the Z-axis direction at each of the +X side in the X-axis direction on the base unit 32, the −X side in the X-axis direction thereon, the +Y side in the Y-axis direction thereon, and the −Y side in the Y-axis direction thereon, and a convex unit 38 protruding from an outer surface of the rear plates 36. A total of four rear plates 36 are provided, the two rear plates 36 are placed with a posture perpendicular to the X-axis direction and the other two are placed with a posture perpendicular to the Y-axis direction. Then, in each of the rear plates 36, the convex units 38 are provided to protrude outwardly of the holder frame 30.

Figure 7A:
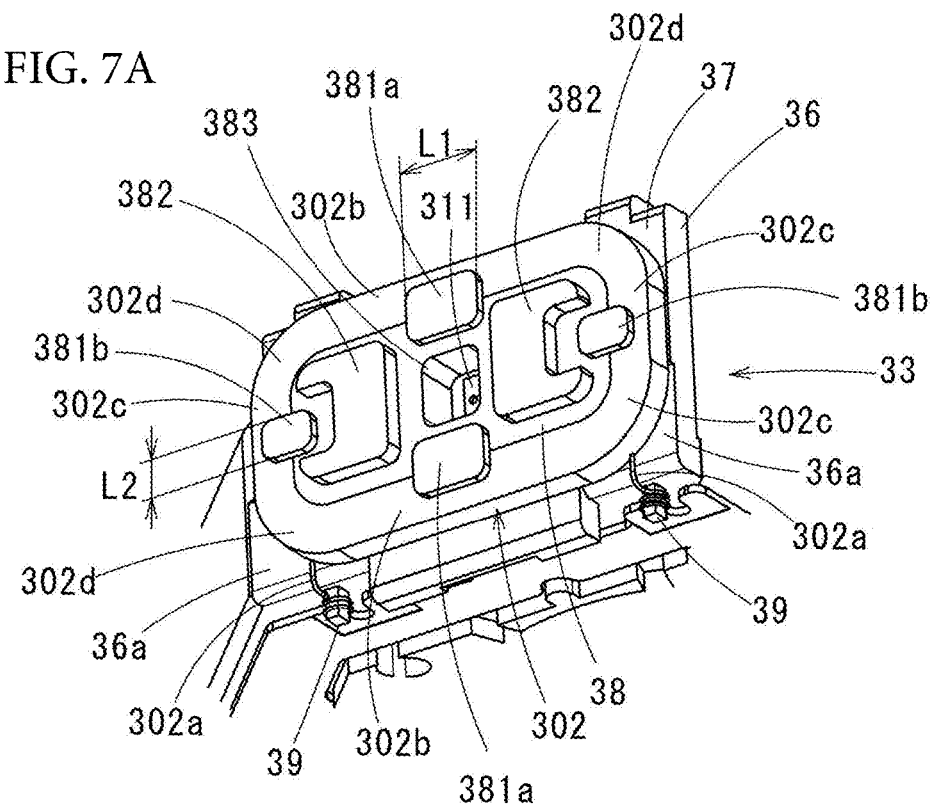
FIG. 7A and FIG. 7B are enlarged perspective views illustrating one coil holding unit in a holder frame of the embodiment of the present invention.
Figure 7A:
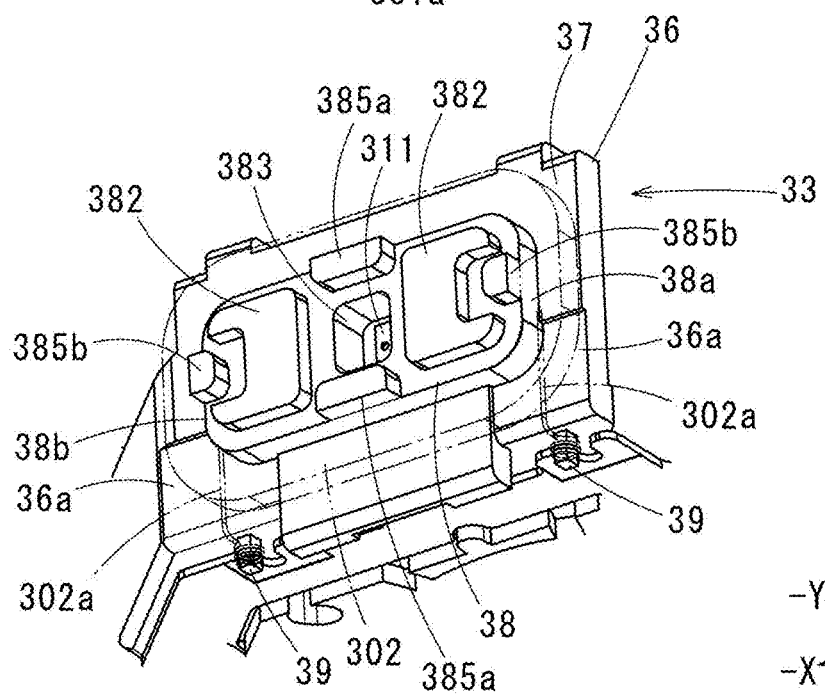
Figure 7B:
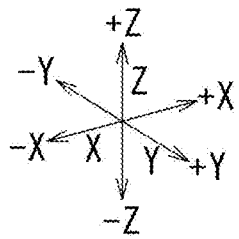

Further, in each of the rear plates 36, the convex units 38 are formed so that a front shape as viewed from each of the protruding directions is a substantially rectangular shape, and a short side of the rectangular shape is placed parallel to the Z-axis direction. As illustrated in FIG. 7A and FIG. 7B, the rear plate 36 is formed to have a size to be projected from the surrounding of the convex unit 38, and two corners at the −Z side in the Z-axis direction, out of four corners of the projected outer surface, are formed to be a depression unit 36a lower than the other surface portions. A surface of a portion other than the depression unit 36a is an abutment surface 37 configured to abut against one end surface in the thickness direction of the oscillating coils 302 when the oscillating coils 302 is held in the convex unit 38. Thus, the surface of the depression unit 36a does not abut against the end face of the oscillating coils 302. Between the surface of the depression unit 36a and the end surface of the oscillating coils 302, a gap slightly larger than one diameter of the conducting wire 302a in the oscillating coils 302 is formed.

Each of the oscillating coils 302 is formed by winding the conducting wire 302a around the convex unit 38 of the rear plate 36, and is placed with one end surface in the thickness direction of the coil being abutted against the abutment surface 37.

Further, at both ends of each of the rear plates 36, specifically, at ends at the +Y side and the −Y side in the Y-axis direction in the rear plate 36 placed with a posture perpendicular to the X-axis direction, or at ends at the +X side and the −X side in the X-axis direction in the rear plate 36 placed with a posture perpendicular to the Y-axis direction, terminal pins 39 each rise to be placed toward the −Z direction of the Z-axis direction at the bottom surface (end surface at the −Z side in the Z-axis direction) of a portion where the depression unit 36a is placed. In the holder frame 30, one rear plate 36 is each placed in the coil holding units 33 placed at four locations, and thus, two terminal pins 39 are placed in each of the rear plates 36, that is, a total of eight terminal pins 39 are provided. These terminal pins 39 are formed from a metal material such as copper alloy having a high conductivity, and are fixed by press-fitting or the like to the holder frame 30.

The two terminal pins 39 in each of the rear plates 36 are placed at a predetermined interval. Specifically, in the rear plate 36 with a posture perpendicular to the X-axis direction, the terminal pins 39 are provided at a predetermined interval in the Y-axis direction, and in the rear plate 36 with a posture perpendicular to the Y-axis direction, the terminal pins 39 are provided at a predetermined interval in the X-axis direction. In each of the rear plates 36, an end at the winding-start side of the oscillating coils 302 is tied to one terminal pin 39, an end at the winding-end side of the oscillating coils 302 is tied to the other terminal pin 39, and the oscillating coil 302 is formed by winding a several times around the convex unit 38 between the both terminal pins 39.

When a side surface potion of the convex unit 38 with which the conducting wire 302 contacts first in a portion at the winding-start side is denoted as a winding-start side contact unit 38a (see FIG. 7B) in the conducting wire 302a of the oscillating coils 302 being directly wound around the convex unit 38, in the rear plate 36, the above-described depression unit 36a is placed between the terminal pins 39 to which the end at the winding-start side of the oscillating coils 302 is fixed and the winding-start contact unit 38a. When a side surface portion opposite the winding-start side contact unit 38a in the convex unit 38 is denoted as a winding-end side contact unit 38b, in the rear plate 36, the above-described depression unit 36a is also placed, between the terminal pins 39 to which the end at the winding-end side of the oscillating coils 302 is fixed and the winding-end side contact unit 38b. That is, at both the winding-start side and the winding-end side, the conducting wire 302a communicating between the oscillating coils 302 and the terminal pins 39 is provided in the depression unit 36a, and then the oscillating coils 302 is raised on the conducting wire 302a to prevent a local deformation or the like.

Further, a front end of the convex unit 38 is formed integrally with coil pressing units 381a, 381b configured to press the end surface (end surface opposite the end surface abutted against the abutment surface) of the oscillating coils 302 wound around the convex unit 38. In this case, the oscillating coils 302 are formed by winding the conducting wire 302a around the convex unit 38 being rectangular in a plan view, and thus, the oscillating coils 302 are formed in a rectangular shape in a plan view. In each of the convex units 38, the coil pressing unit 381 includes two coil pressing units 381a configured to press two long side units 302b of the oscillating coils 302 and two coil pressing units 381b configured to press short side units 302c at two locations of the oscillating coils 302.

As described above, the oscillating coils 302 are formed by annularly winding the conducting wire 302a a plurality of times around the convex unit 38, and the conducting wire 302a is linearly bundled in the long side unit 302b and the short side unit 302c of the rectangle; however, are formed in a 90-degree curved manner in a curved unit 302d of the rectangle. Therefore, in the curved unit 302d, the dimension in the thickness direction tends to increase as compared to the long side unit 302b and the short side unit 302c, and a variation therein also tends to increase as compared to the long side unit 302b and the short side unit 302c. Thus, the coil pressing unit 381 is configured to press the long side unit 302b and the short side unit 302c while avoiding the curved unit 302d of the oscillating coils 302.

Each of the coil pressing units 381a, 381b is provided on a front end surface of the convex unit 38, and is protruded in parallel to the abutment surface 37 outwardly toward the center of the oscillating coils 302 from the periphery of the convex unit 38, and the protruded portion presses the end surface of the oscillating coils 302. These coil pressing units 381a, 381b are formed in a plate shape having a length along the winding direction of the oscillating coils 302, and one of the units presses an intermediate portion in the length direction of the long side unit 302b of the oscillating coils 302 and the other presses an intermediate portion of the length direction of the short side unit 302c. In this case, a length (W1) of the coil pressing units 381a, 381b protruded from the periphery of the convex unit 38 may be, for example, a dimension by which it is possible to press ⅔ or more of a winding width (W2) of the oscillating coils 302 (see FIG. 8B). Further, in each of the coil pressing units 381a, 381b, the dimensions along the length direction of the oscillating coils 302 are designed so that a length (L1) of the coil pressing unit 381a configured to press the long side unit 302b is formed to be larger than a length (L2) of the coil pressing unit 381b configured to press the short side unit 302c, and are formed to be lengths corresponding to each of lengths of the long side unit 302b and the short side unit 302c (see FIG. 7A).

Further, a second convex unit 382 protruding further outwardly of the holder frame 30 than the outer surface (surface facing the oscillation magnets 301) of the coil pressing units 381a, 381b is formed in each of the convex units 38. In the present embodiment, the convex unit 38 is formed in a rectangular shape in a front view, and thus, one second convex unit 382 is each formed at either end of the convex unit 38, specifically, at the +Y side and the −Y side in the Y-axis direction in the convex unit 38 of the rear plate 36 placed with a posture perpendicular to the X-axis direction, or at the +X side and −X side in the X-axis direction in the convex unit 38 of the rear plate 36 placed with a posture perpendicular to the Y-axis direction. These second convex units 382 are formed to protrude at a position to avoid the coil pressing units 381a, 381b of each of the convex units 38 and the periphery of the convex unit 38. The front end of the second convex unit 382 and the surface of the oscillation magnets 301 face each other with a slight gap g therebetween (see FIG. 8B). The gap g is set to have a size such that when the oscillating coils 302 oscillate within an oscillation available range (for example,) ±6°), the oscillation is not inhibited, but when the oscillating coils 302 attempt to oscillate beyond the oscillation available range, the front end of the second convex unit 382 abuts the oscillation magnets 301.

It is noted that in any one coil holding unit 33 of the four coil holding units 33, that is, the convex unit 38 in the coil holding units 33 placed at the −Y side in the Y-axis direction, in the example illustrated in FIG. 3 or the like, a concave unit 383 is formed to be placed between the both second convex units 382, and in the concave unit 383, as illustrated in FIG. 7A and FIG. 7B, a magnetism detection element 311 such as a hole element configured to detect an oscillation position from a magnetic change, is used.

(Configuration of Gimbal Mechanism 50)

In the photographing optical device 100 of the present embodiment, the gimbal mechanism 50 described below is configured between the rotor 40 of the movable body 10 and the holder frame 30 of the movable body 10 to oscillatably support the movable body 10 around the first axis R and the second axis R2.

In the present embodiment, in the gimbal mechanism 50, the movable frame 51 is provided in the movable frame placement space 140 of the holder frame 30. The movable frame 51 as illustrated in FIG. 3, FIG. 5, and FIG. 6, is formed in an annular shape by a thin plate, and is placed in the movable frame placement space 140 of the holder frame 30. Further, projections 52 are integrally formed outward in the radial direction relative to the center of the annular shape of the movable frame 51 at four positions spaced apart by 90° in the circumferential direction in the movable frame 51, and further, each of the projections 52 is fixed with a spherical body 53 by welding or the like to direct a hemispherical convex surface outward in the radial direction.

On the other hand, the grooves 35, 49 are each formed inside the coupling unit 34 between the coupled coil holding units 33 in the holder frame 30 and inside the frame unit 48 of the rotor 40 placed between the coil holding units 33. The grooves 35, 49 are each attached with the contact spring 510, and each of the contact springs 510 supports the tip of the convex unit of each spherical body 53 in the movable frame 51.

Specifically, each of the contact springs 510 is formed to be bent in a U-letter shape as viewed in a vertical section by press-molding a plate material made of a metal such as elastically deformable stainless steel, and includes an attachment unit 511 to be fixed in each of the grooves 35, 49 of the holder frame 30 and the rotor frame 42, and a receiving plate unit 512 folded back from one end of the attachment unit 511 and extending substantially parallel to the attachment unit 511. The contact springs 510 are placed so that the attachment unit 511 is fixed, with an adhesive or the like, on an inner surface of each of the grooves 35, 49 of the holder frame 30 or the rotor frame 42, and the receiving plate unit 512 faces the module holder holding unit 31. Further, in each of the receiving plate units 512, a concave unit 513 is formed to receive the tip of the convex unit of each spherical body 53 in the movable frame 51. The contact spring 510 is elastically deformable in a direction into which the attachment unit 511 and the receiving plate unit 512 are spaced and approach, and can apply an elastic load to a point contacting with the spherical body 53 of the movable frame 51, from an outer side to an inner side in the radial direction of the movable frame 51.

The movable frame 51 is placed in the movable frame placement space 140 of the holder frame 30, and the spherical bodies 53 provided in the projections 52 at four locations at the outer peripheral side of the movable frame 51 are brought into elastic contact with the concave unit 513 of the receiving plate unit 512 of each of the contact springs 510 attached to the holder frame 30 and the rotor frame 42, from the inner side in the radial direction of the holder frame 30.

In this case, as illustrated in FIG. 6, the contact springs 510 fixed in the holder frame 30 face each other to form a pair in the first axis R direction, and configure a first oscillation fulcrum 55 between the contact springs 510 and the spherical body 53 of the movable frame 51. On the other hand, the contact springs 510 fixed in the rotor frame 42 face each other to form a pair in the second axis R2 direction, and configure a second oscillation fulcrum 56 between the contact springs 540 and the spherical body 53 of the movable frame 51.

Therefore, the movable frame 51 is capable of oscillating relative to the rotor frame 42 around the second axis R2, and the holder frame 30 is oscillatably supported around the first axis R relative to the movable frame 51.

In the gimbal mechanism 50 thus configured, a biasing force of each of the contact springs 510 is set equally. It is noted that in the present embodiment, a magnetic drive mechanism is used for the oscillation drive mechanism 300, and thus, both the movable frame 51 and the contact spring 510 used for the gimbal mechanism 50 are made from a nonmagnetic material. In the present embodiment, the movable frame 51 is placed at the same height position (the same position in the Z-axis direction) as the coil holding units 33. Therefore, as viewed from the direction perpendicular to the optical axis L direction, the gimbal mechanism 50 is provided in a position overlapping with the oscillation drive mechanism 300. In particular, in the present embodiment, as illustrated in FIG. 5, as viewed from the direction perpendicular to the optical axis L direction, the gimbal mechanism 50 is provided at a position overlapping with the center in the Z-axis direction of the oscillating coils 302 in the oscillation drive mechanism 300.

(Method of Manufacturing Coil Unit in Photographing Optical Device 100)

In manufacturing the photographing optical device 100 thus configured, the oscillating coils 302 of the oscillation drive mechanism 300 are wound around the coil holding units 33 as described below.

Figure 8A:
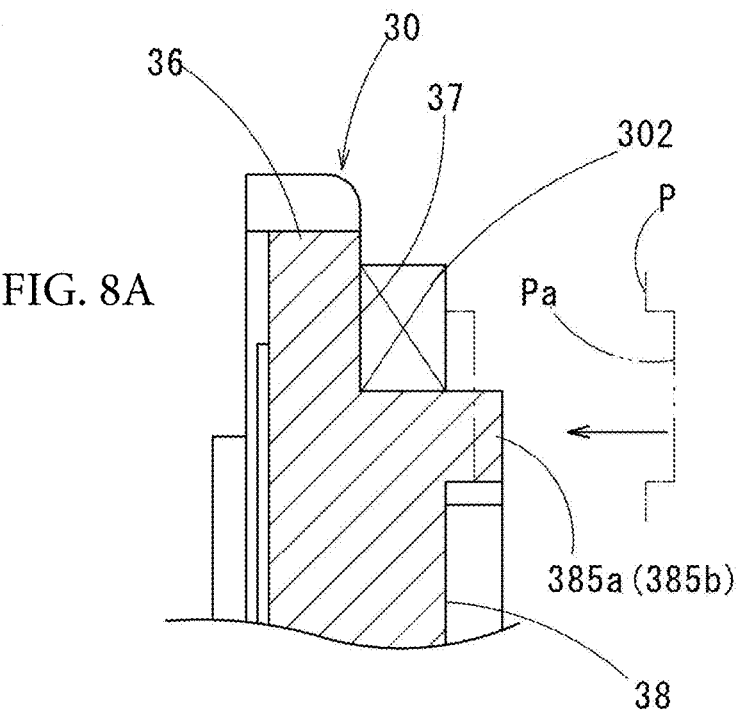
FIG. 8A and FIG. 8B are partially enlarged sectional views of the coil holding unit in FIG. 7A and FIG. 7B.
Figure 8B:
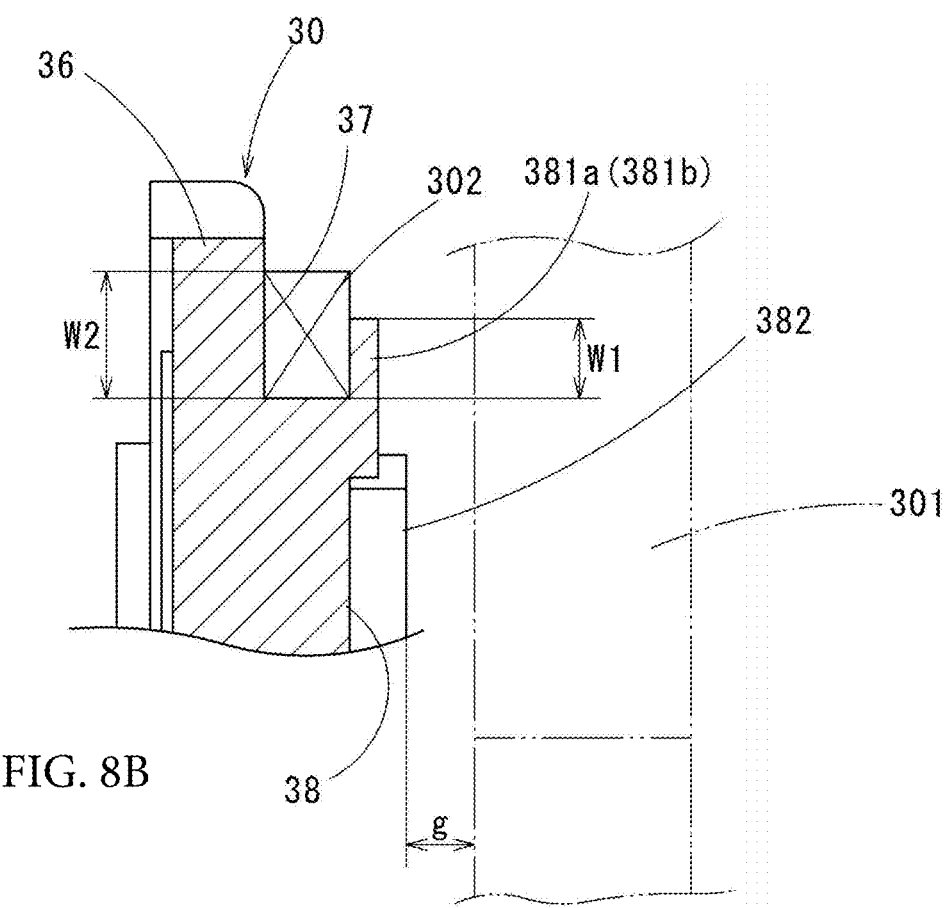

As described above, in the assembled state, the coil pressing units 381*a*, 381*b* protrude parallel to the abutment surface 37 from the periphery of the convex unit 38 to press the end surface of the oscillating coils 302. The coil pressing units 381*a*, 381*b* are formed by winding the oscillating coils 302 around the convex unit 38, which is then deformed, as described below. The coil pressing units 381*a*, 381*b* are not protruded from the periphery of the convex unit 38 before the oscillating coils 302 are wound, and as illustrated in FIG. 7A and FIG. 8A, the coil pressing units 381*a*, 381*b* are formed to be protruded from the convex unit 38 outwardly of the holder frame 30. The coil pressing units 381*a*, 381*b* in this state are only referred to as protrusions 385*a*, 385*b*. After the oscillating coils 302 are wound around the convex unit 38, when the protrusions 385*a*, 385*b* are deformed, the coil pressing units 381*a*, 381*b* can be obtained. A method of winding the oscillating coils 302 around the convex unit 38 will be sequentially described below.

To wind the conducting wire 302*a* of the oscillating coils 302 around the convex unit 38, a winding device 61 as described below will be used.

Figure 9:
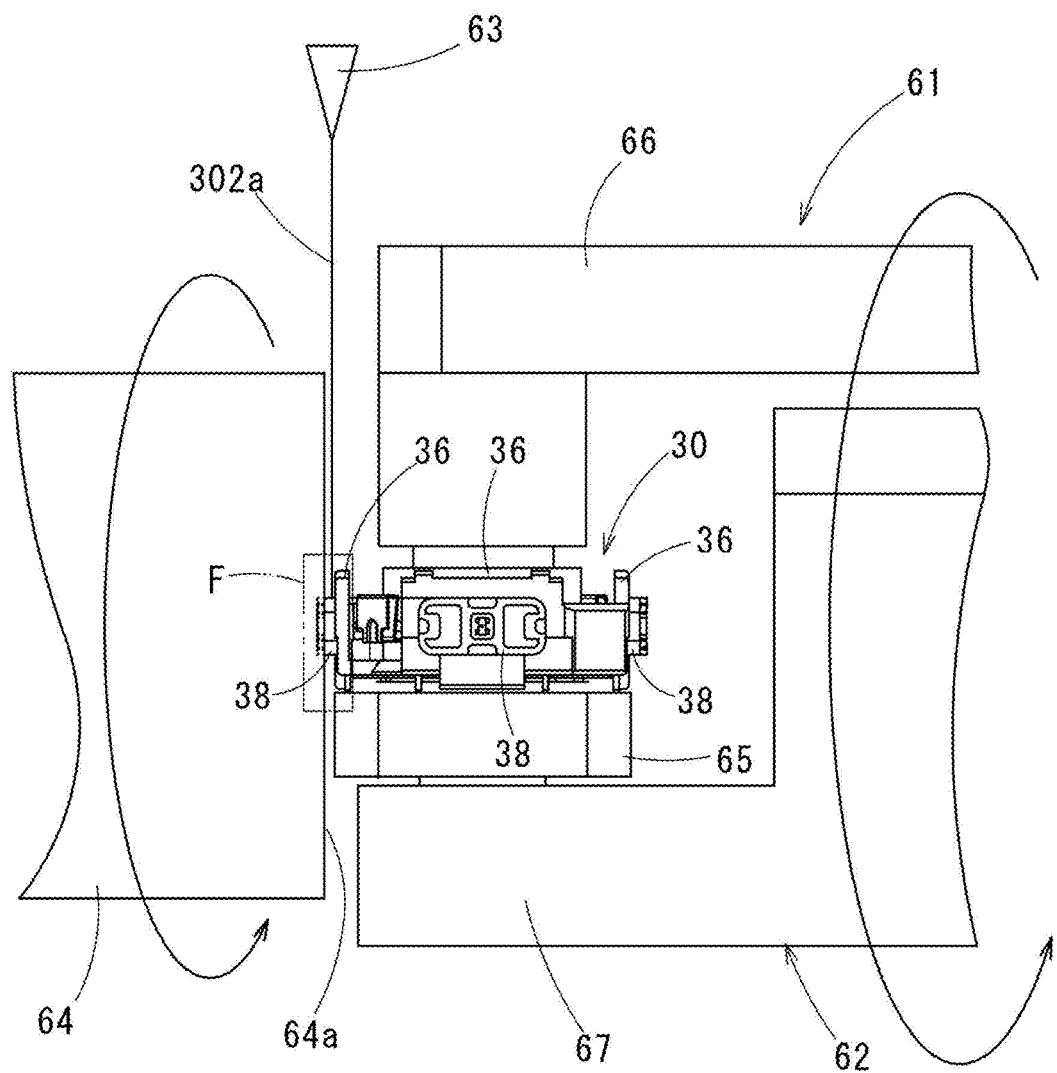
FIG. 9 is a schematic diagram illustrating a winding device configured to wind an oscillating coil to the coil holding unit.
Figure 10:
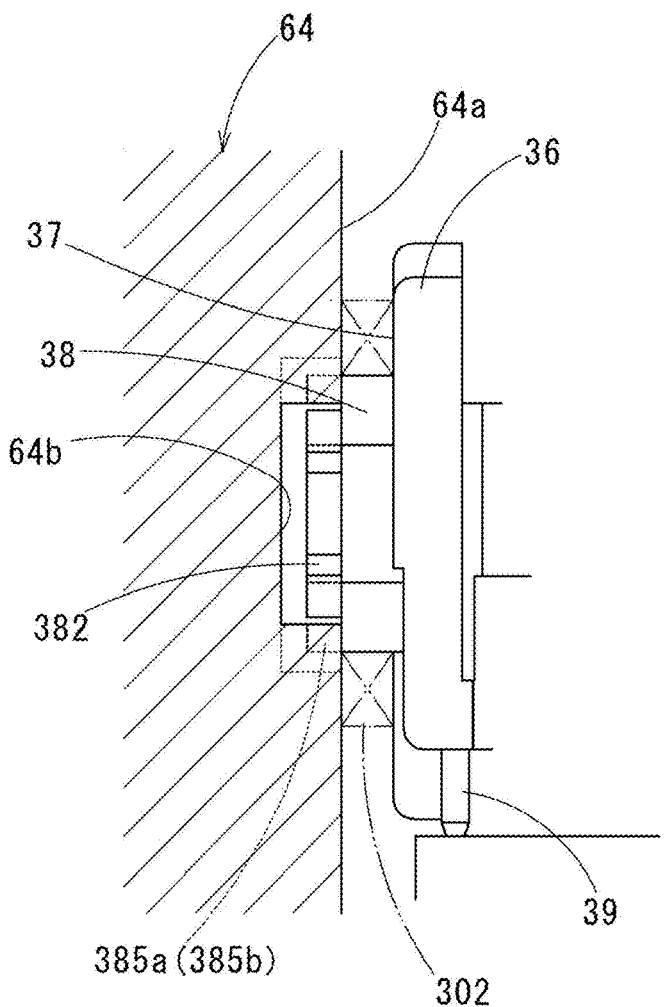
FIG. 10 is a partially enlarged sectional view for describing a configuration of an F part in FIG. 9.

The winding device 61 includes a main body unit 62 fixed with the holder frame 30, a rotation mechanism configured to rotate the main body unit 62 (not illustrated), a supply nozzle 63 configured to supply the conducting wire 302*a* configuring the oscillating coils 302, and a dependent head 64 configured to rotate together with the main body unit 62, as illustrated in FIG. 9 and FIG. 10. The main body unit 62 includes a holder mounting unit 65 mounted with the holder frame 30, a clamp unit 66 configured to fix the holder frame 30 interposed between the clamp unit 66 and the holder mounting unit 65, and a base unit 67 configured to rotatably hold the holder mounting unit 65 where the vertical direction in FIG. 9 is set as an axial direction of revolution and to movably hold the clamp unit 66 in the vertical direction in FIG. 9. The main body unit 62 is rotatable where the horizontal direction in FIG. 9 is set as an axial direction of rotation.

The dependent head 64 is capable of linear movement in the horizontal direction in FIG. 9. Further, the dependent head 64 is capable of rotation where the horizontal direction in FIG. 9 is set as an axial direction of rotation. The dependent head 64 is liked with a rotation mechanism configured to rotate the dependent head 64, and the main body unit 62 and the dependent head 64 rotate in synchronization with each other. Further, the dependent head 64 is formed with a planar contact surface 64*a* in contact with the front end surface of the convex unit 38 of the holder frame 30. Moreover, the dependent head 64 is formed with a concave unit 64*b* into which the second convex unit 382 and the protrusions 385*a*, 385*b* enter, as illustrated in FIG. 10.

When the winding device 61 is used to wind the oscillating coils 302 around the convex unit 38, firstly, the holder frame 30 is fixed to the main body unit 62, and an end at the winding-start side of the oscillating coils 302 is tied to the terminal pin 39 for fixation. Thereafter, the second convex unit 382 and the protrusions 385*a*, 385*b* are placed in the concave unit 64*b* of the dependent head 64, and the dependent head 64 is moved so that the contact surface 64*a* of the dependent head 64 is pressed against the front end surface of the convex unit 38. In this state, when the main body unit 62 and the dependent head 64 are rotated together while the conducting wire is supplied from the supply nozzle 63, the conducting wire 302*a* is wound around the convex unit 38 to form the oscillating coils 302. Further, when the oscillating coils 302 are wound around the convex unit 38, the rotation of the main body unit 62 and the dependent head 64 is stopped, and an end at the winding-end side of the oscillating coils 302 is tied to the terminal pins 39 for fixation.

After the end at the winding-end side of the oscillating coils 302 is tied to the terminal pins 39 for fixation, the holder mounting unit 65 is revolved by 90° relative to the base unit 67, and then likewise, the oscillating coils 302 are wound around the next convex unit 38. In this manner, the oscillating coils 302 are sequentially wound around each of the convex units 38. It is noted that each time winding of the oscillating coils 302 around each of the convex units 38 is ended, the dependent head 64 and the clamp unit 66 are moved so that the revolution of the holder mounting unit 65 on which the holder frame 30 is mounted is enabled.

It is noted that in the present embodiment, the conducting wire 302*a* configuring the oscillating coils 302 is a fused wire having a fused coating, and each time the winding of the oscillating coils 302 around each of the convex units 38 is ended, the holder frame 30 and the oscillating coils 302 are heated to fuse the conducting wires 302*a*.

After the oscillating coils 302 are thus wound around each of the four convex units 38, the holder frame 30 is removed from the winding device 61, the protrusions 385*a*, 385*b* protruding outwardly of the holder frame 30 from the front end of each of the convex units 38 are deformed to be deformed to protrude outwardly in the radial direction relative to the center of the oscillating coil 302 in parallel to the abutment surface 37 from the distal end periphery of the convex unit 38 to form the coil pressing units 381*a*, 381*b* configured to press the end surface (end surface at the opposite side of the end surface abutting against the abutment surface 37) of the oscillating coils 302 wound around the convex units 38. In the protrusions 385*a*, 385*b*, a whole of the holder frame 30 is made of synthetic resin, and thus, while a pressing plate heated to a high temperature is pressed against the front end of the protrusions 385*a*, 385*b*, and a part of the protrusions 385*a*, 385*b* is melted or softened and crushed with the heat, the crushed portion is deformed to protrude outwardly toward the center of the oscillating coil 302 from the periphery of the convex unit 38 to press the end surface of the oscillating coils 302.

For example, as illustrated by a two-dot chain line in FIG. 8A, a concave unit Pa with a size allowing the coil pressing units 381a, 381b to fit thereinto is formed at the front end of a pressing plate P, and while the protrusions 385a, 385b are crushed with the bottom surface of the concave unit Pa, the concave unit Pa is filled with the crushed resin to form the coil pressing units 381a, 381b.

Because of the formation of the coil pressing units 381, 381b, each of the oscillating coils 302 is sandwiched and held, while being wound around the convex unit 38, between the abutment surface 37 of the rear plate 36 and the coil pressing units 381a, 381b at the front end of the convex unit 38.

(Main Operation of Present Mode)

In the photographing optical device 100 thus configured, for the pitching and the yawing, the optical module 1 can be oscillated around the first axis R and the second axis R2 by the oscillation drive mechanism 300 to correct the shake. Further, for the rolling, the rotor 40 can be revolved around the optical axis L by the rolling drive mechanism 400 to correct the shake. Specifically, in the oscillation drive mechanism 300, in the magnetic field by the magnet 301 in the case 210, an electromagnetic force is generated by supplying a current to the driving coil 302, and by the electromagnetic force, the holder frame 30 (movable body 10) is oscillated around one or both of the first axis R and the second axis R2 relative to the case 210 (fixation body 20) to control the posture of the optical module 1. In the rolling drive mechanism 400, in the magnetic field of the magnet 401 fixed to the bottom cover 220, a current is applied to the drive coil 402 to generate an electromagnetic force, and by the electromagnetic force, the rotor 40 is revolved around the optical axis L relative to the bottom cover 220 (fixation body 20) to control the posture of the optical module 1.

During control of the optical module 1, a feedback control is performed while detecting an oscillation position from a change of magnetic field by the magnetism detection elements 311, 411.

(Main Effect of Present Mode)

In the photographing optical device 100, the oscillating coils 302 are wound around the convex unit 38 of the holder frame 30 and held in a sandwiched state between the abutment surface 37 of the rear plate 36 and the coil pressing units 381a, 381b, and thus, it is possible to ensure that the oscillating coils 302 is held in the convex unit 38 to prevent the oscillating coils 302 from falling off. In the embodiment, a fused wire having a fused coating is used as the conducting wire 302a, and the conducting wire 302a is wound around the convex unit 38 and then fused; however, the conducting wire 302a is surely held by the coil pressing units 381a, 381b, and thus, the conducting wire 302a is not necessarily fused. Alternatively, even if the fused coating is provided, it is possible to decrease the thickness of the coating.

When the oscillating coils 302 are fixed to the convex unit 38, the protrusions 385a, 385b protruding outwardly of the holder frame 30 from the convex unit 38 are previously formed, and after the oscillating coils 302 are wound around the convex unit 38, the protrusions 385a, 385b are deformed to form the coil pressing units 381a, 381b. As a result, a winding operation of the oscillating coils 302 and a forming operation of the coil pressing units 381a, 381b can be implemented continuously to ensure that the oscillating coils 302 is held and fixed. In the embodiment, the coil pressing units 381a, 381b can be formed by crushing the protrusions 385a, 385b with the heated plate P, and a fixing operation of the oscillating coils 302 is easy.

Further, the coil pressing units 381a, 381b press linear portions such as the long side unit 302b and the short side unit 302c having only a slight variation in thickness, as the oscillating coils 302, and thus, the oscillating coils 302 can be stably fixed. In this case, the coil pressing unit 381a configured to press the long side unit 302b is formed to be longer in a winding direction of the conducting wire 302a of the oscillating coil 302 than the coil pressing unit 381b configured to press the short side unit 302c, and thus, the long side unit 302b that falls off easily can be pressed over a long range for stabled fixation. The length of the coil pressing units 381a, 381b is set according to the length of the long side unit 302b and the short side unit 302c; however, the number of coil pressing units may be set according to the length of the long side unit 302b and the short side unit 302c such that all the coil pressing units are all formed equally in size, for example, two of the coil pressing units are placed in the long side unit 302b and one of the coil pressing units can be placed in the short side unit 302c.

In the photographing optical device 100 in which the oscillating coils 302 are fixed, during a posture control based on the shake, the oscillating coils 302 can freely oscillate within a usual oscillation available range (±6°), and when the oscillating coils 302 attempt to oscillate beyond the oscillation available range, the front end of the second convex unit 382 abuts against the oscillation magnets 301 to prevent further oscillation. Therefore, collision between the oscillating coils 302 and the oscillation magnets 301 can be prevented, and it is possible to prevent a damage of these components and to perform a stable shake correction.

Other Embodiments

In addition, the present invention is not limited to the above embodiment, and it is possible to apply various modifications without departing from the spirit of the present invention.

Figure 11:
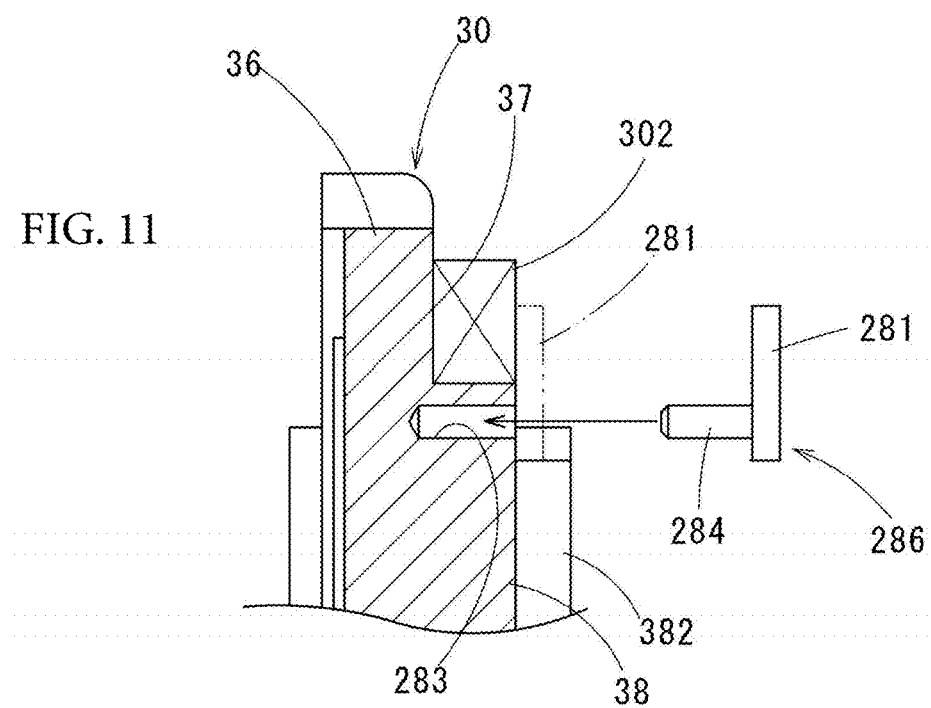
FIG. 11 is an enlarged sectional view of a main part illustrating a modification of the coil pressing unit.

For example, in the above-described embodiment, the protrusions 385a, 385b protruding outwardly of the holder frame 30 are formed at the front end of the convex unit 38, and after the oscillating coils 302 are wound around the convex unit 38, the protrusions 385a, 385b are crushed to form the coil pressing units 381a, 381b. However, as illustrated in FIG. 11, a hole 283 configured to open may be formed at the front end of the convex unit 38, in addition, a coil pressing member 286 obtained by integrating a pin 284 and a coil pressing unit 281 may be formed, and after the oscillating coils 302 are wound, the pin 284 of the coil pressing member 286 may be inserted into the hole 283 of the convex unit 38 for fixation to press the oscillating coils 302 with the coil pressing unit 281.

Further, both of the long side unit 302b and the short side unit 302c of the oscillating coils 302 are pressed by the coil pressing units 381a, 381b; however, only one of the long side unit 302b and the short side unit 302c may be pressed.

Further, the oscillating coils 302 are attached to the convex unit 38 by directly winding the conducting wire 302a around the convex unit 38 of the holder frame 30; however, a coil previously formed in a wound state in an annular shape with a sufficient size to fit into the convex unit 38 may be attached to the convex unit 38.

Further, in the embodiment, in the rolling coil 402 of the rolling drive mechanism 400 is attached through abutment against the attachment surface 41a of the rotor bottom 41, and the coil pressing unit is not provided; however, the rolling coil 402 may be provided with a coil pressing unit such as the coil pressing units 281a, 281b configured to hold the oscillating coils 302 of the oscillation drive mechanism 300.

Further, the gimbal mechanism 50 adopts a structure where the spherical body 53 fixed to the movable frame 51 is made to contact the contact spring 510, however the spherical body 53 may not necessarily be needed, and it is possible to adopt a structure where a spherical front end face formed by shaping the front end face of a rod-shaped member or the like spherically is made to contact the contact spring 510.

Further, as a support mechanism configured to support the movable body 10 to the fixation body 20, a mechanism for oscillatably supporting the body is configured by the gimbal mechanism 50; however, a support mechanism by a pivot shaft in a direction running substantially along the optical axis L may be adopted, and in that case, the front end face of the pivot shaft is formed to be a spherical front end face, and the pivot shaft oscillates in the direction intersecting the optical axis L around its spherical front end face.

It is noted that the coil unit of at least an embodiment of the present invention may be applied to a device other than the photographing optical device as a mechanism configured to hold a coil in various types of actuators using the coil and a magnet.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coil unit, comprising:
   a coil holding member configured to hold a coil; and
   a coil held by the coil holding member and formed by a conducting wire in a wound state;
   wherein a direction perpendicular to a length direction of the conducting wire is a thickness direction of the coil; and
   the coil holding member comprises:
      an abutment surface configured to abut against one end surface in the thickness direction of the coil,
      a convex unit protruding from the abutment surface and around which the conducting wire is wound, and
      a coil pressing unit extending from a front end surface of the convex unit and configured to press the other end surface in the thickness direction of the coil.

2. The coil unit according to claim 1, wherein the coil pressing unit is formed by deforming a part of the convex unit.

3. The coil unit according to claim 2, wherein the coil pressing unit comprises synthetic resin.

4. The coil unit according to claim 1, wherein the coil is formed in a substantially rectangular frame shape having a long side unit and a short side unit, and the coil pressing unit is provided to press at least the long side unit.

5. The coil unit according to claim 4, wherein the coil pressing unit is provided in a linear portion while avoiding a curved unit between the long side unit and the short side unit.

6. The coil unit according to claim 5, wherein the coil pressing unit is provided to press each of the long side unit and the short side unit.

7. The coil unit according to claim 6, wherein the coil pressing unit configured to press the long side unit and the coil pressing unit configured to press the short side unit have a length corresponding to a length of the long side unit or the short side unit.

8. The coil unit according to claim 6, wherein a number of the coil pressing units configured to press the long side unit is larger than a number of the coil pressing units configured to press the short side unit.

9. The coil unit according to claim 8, wherein the coil pressing units are all formed equally in size.

10. A photographing optical device, comprising:
    the coil unit according to claim 1;
    an optical module including a lens and an imaging element, the optical module being fixed to the coil holding member;
    a fixation body configured to oscillatably support the coil unit; and
    a driving magnet fixed to the fixation body and placed facing the coil.

11. The photographing optical device according to claim 10, wherein the convex unit of the coil holding member comprises a second convex unit protruding toward the driving magnet relative to the coil pressing unit.

12. A method of manufacturing a coil unit comprising a coil holding member configured to hold a coil; and a coil held by the coil holding member and formed by a conducting wire in a wound state; wherein a direction perpendicular to a length direction of the conducting wire is a thickness direction of the coil; and the coil holding member comprises an abutment surface configured to abut against one end surface in the thickness direction of the coil, a convex unit protruding from the abutment surface and around which the conducting wire is wound, and a coil pressing unit extending from a front end surface of the convex unit and configured to press the other end surface in the thickness direction of the coil, the method comprising:
    forming a protrusion in the convex unit of the coil holding member, and after attaching the coil to the convex unit, forming the coil pressing unit by deforming the protrusion.

13. The method of manufacturing the coil unit according to claim 12, wherein the protrusion is made of synthetic resin and the coil pressing unit is formed by deforming the protrusion by heat.

* * * * *